United States Patent [19]

Navarro

[11] Patent Number: 5,473,957
[45] Date of Patent: Dec. 12, 1995

[54] SYSTEM FOR GENERATING CONTROLLABLE REFERENCE ENVIRONMENT AND STEERABLE TRANSLATIONAL FORCE FROM INTERACTION THEREWITH

[76] Inventor: Thomas L. Navarro, 2914 Benton St., Wheatridge, Colo. 80214

[21] Appl. No.: 215,311

[22] Filed: Mar. 21, 1994

[51] Int. Cl.⁶ .................................................. F16H 33/20
[52] U.S. Cl. ............................................... 74/84 R; 74/61
[58] Field of Search ............................ 74/61, 84 R, 84 S

[56] References Cited

U.S. PATENT DOCUMENTS

| | | | |
|---|---|---|---|
| 3,530,617 | 9/1970 | Halvorson et al. | 46/243 |
| 3,913,409 | 10/1975 | Opdereck | 74/61 |
| 4,241,615 | 12/1980 | Ryan | 74/87 |
| 4,712,439 | 12/1987 | North | 74/84 R |
| 5,150,626 | 9/1992 | Navarro et al. | 74/84 R |
| 5,167,163 | 12/1992 | McMahon | 74/84 S |

FOREIGN PATENT DOCUMENTS

| | | | |
|---|---|---|---|
| 2456861 | 1/1981 | France | 74/84 S |
| 1384345 | 3/1988 | U.S.S.R. | 74/87 |
| 2096268 | 10/1982 | United Kingdom | 74/84 R |

Primary Examiner—Allan D. Herrmann
Attorney, Agent, or Firm—John R. Flanagan

[57] ABSTRACT

A controlled translational force generating system includes a main frame, a first set of parallel eccentric mass subsystems mounted on the main frame and being counterrotatable to generate a set of initial translational forces, and a second set of parallel balance subsystems mounted on the main frame and being counterrotatable to produce a controlled reference environment. The set of translational forces generated by the parallel eccentric mass subsystems through interaction with the controlled reference environment produced by the parallel balance subsystems produce a controllably steerable straight-line resultant translational force which causes the generating system to move along a desired directional path.

8 Claims, 2 Drawing Sheets

5,473,957

SYSTEM FOR GENERATING CONTROLLABLE REFERENCE ENVIRONMENT AND STEERABLE TRANSLATIONAL FORCE FROM INTERACTION THEREWITH

BACKGROUND OF THE INVENTION

1. Field of the Invention

The present invention generally relates to force generating systems and, more particularly, is concerned with a system for generating a controlled reference environment and a steerable translational force from interaction with the reference environment.

2. Description of the Prior Art

Propulsive systems for driving a vehicle and flying an airplane can and typically do rely on interactions with external environments to generate a desired translational motion. For instance, travel of a vehicle is generated by the friction between its rotatably-driven wheels and the road, whereas the flight of an airplane is generated by the pull of propellers against the air or the thrust or push of jet engines against the air.

The apparatus of U.S. Pat. No. 5,150,626 to Navarro et al employed a rotatably-driven asymmetrically-accelerated eccentric mass system which interacted with an external environment, such as a surface supporting the apparatus, for generating translational force. However, a drawback of the patented apparatus is that the force so generated typically translates along a curved path or eventually the apparatus travels in a curved path due to the rotation of the asymmetrical mass within the system, or simply due to rotation of orbital members employed within the system.

Consequently, a need exists for improvement to the above-cited patented apparatus in order to overcome its drawback and permit control over the direction in which the force generated by the system is translated.

SUMMARY OF THE INVENTION

The present invention provides a controlled translational force generating system designed to satisfy the aforementioned need. The controlled translational force generating system of the present invention basically comprises: (a) a main frame; (b) a first set of subsystems mounted on the main frame and being counterrotatable relative to one another to generate a set of initial translational forces; and (c) a second set of subsystems mounted on the main frame and being counterrotatable relative to one another to produce a controlled reference environment such that interaction of the first set of subsystems with the controlled reference environment generated by the second set of subsystems produces from the set of initial translational forces a steerably controllable straight-line resultant translational force that causes the system to move along a desired directional path.

More particularly, the first set of subsystems includes a pair of axially-parallel arranged, counterrotatably-driven, and asymmetrically-accelerated eccentric mass subsystems which are operable to generate the initial translational forces. The second set of subsystems includes a pair of axially-parallel arranged and counterrotatable and controllable balance subsystems which are operable to internally produce the reference environment. By separately and variably adjusting the rotational rates of the parallel eccentric mass and balance subsystems, the resultant translational force generated by the parallel eccentric mass subsystems can be steered in any predetermined direction to move the system along any desired directional path.

These and other features and advantages of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the following detailed description, reference will be made to the attached drawings in which.

DETAILED DESCRIPTION OF THE INVENTION

Figure 1:
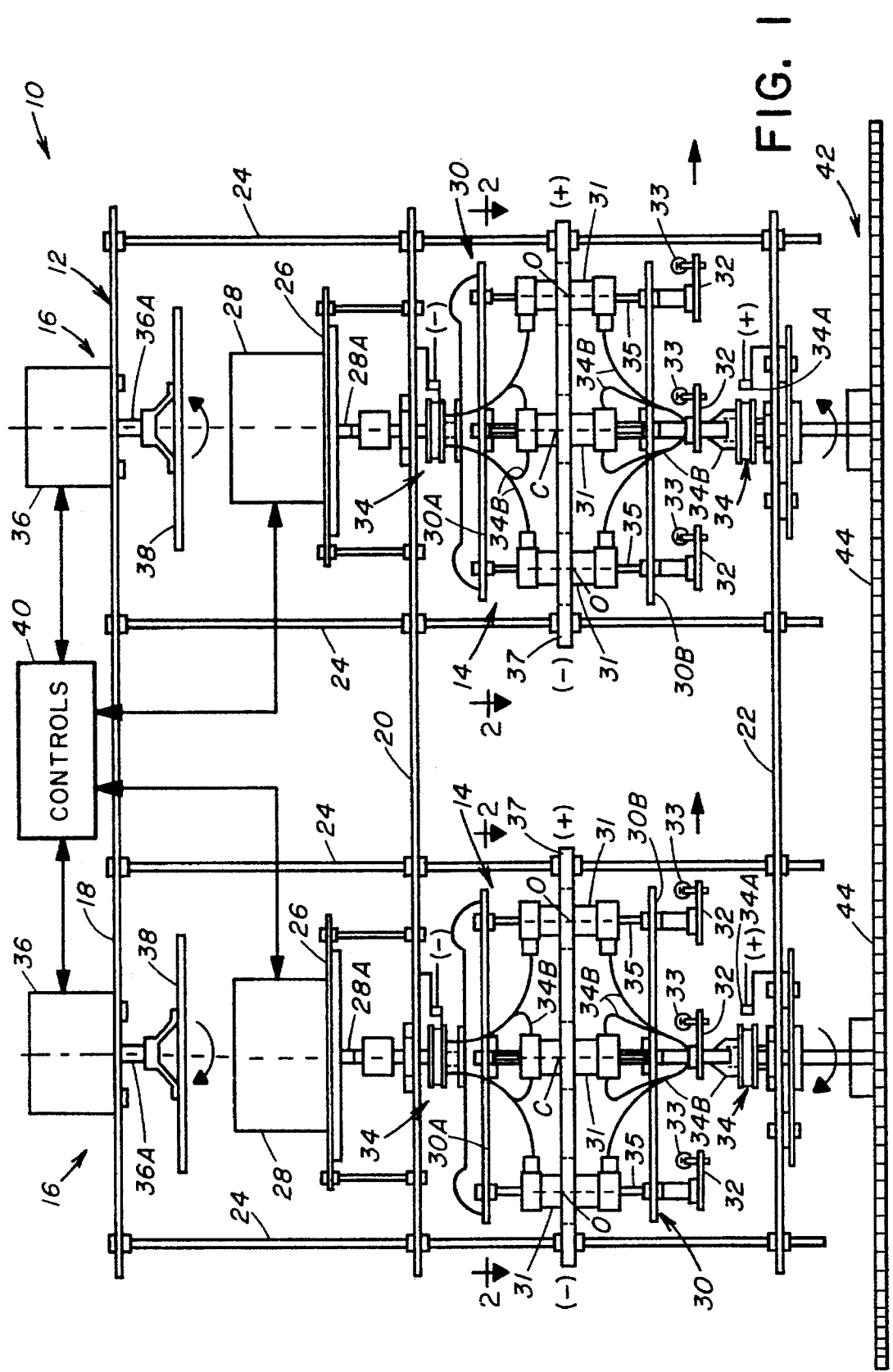
FIG. 1 is a side elevational view of a controlled translational force generating system in accordance with the present invention.

Referring to the drawings, and particularly to FIG. 1, there is illustrated a controlled translational force generating system, generally designated 10, provided in accordance with the principles of the present invention. The controlled translational force generating system 10 basically includes a main frame 12, a first set 14 of subsystems mounted on the main frame 12 and operable to generate a set of initial translational forces, and a second set 16 of subsystems mounted on the main frame 12 and operable to produce a controlled reference environment. The set of initial translational forces generated by the first set 14 of subsystems by interaction with the controlled reference environment generated by the second set 16 of subsystems produce a steerable straight-line resultant translational force which causes the system 10 to move along a desired directional path. More particularly, the first set 14 of subsystems includes a pair of axially-parallel arranged, counterrotatably-driven, and asymmetrically-accelerated eccentric mass subsystems 14 which are operable for generating the set of initial translational forces. The second set 16 of subsystems includes a pair of axially-parallel arranged and counterrotatable and controllable balance subsystems 16 which are operable for internally producing the reference environment. By separately and variably adjusting the individual rotational rates of the parallel eccentric mass and balance subsystems 14, 16, the resultant translational force through interaction with the reference environment can be controllably steered in any predetermined direction to move the system 10 along any desired directional path.

In the embodiment of the controlled translational force generating system 10 illustrated in FIG. 1, the main frame 12 includes a plurality of upper, middle and lower horizontal platforms 18, 20, 22 and a plurality of vertical legs 24 supporting the platforms 18, 20, 22 in vertically spaced relation. Preferably, by way of illustration only and not by limitation, the platforms 18, 20, 22 are rectangular shaped and the legs 24 being eight in number (only the four along one of a pair of opposite sides of the frame 12 being shown), are attached to and support the platforms 18, 20, 22 at spaced locations along the perimeters thereof.

Figures 2, 3:
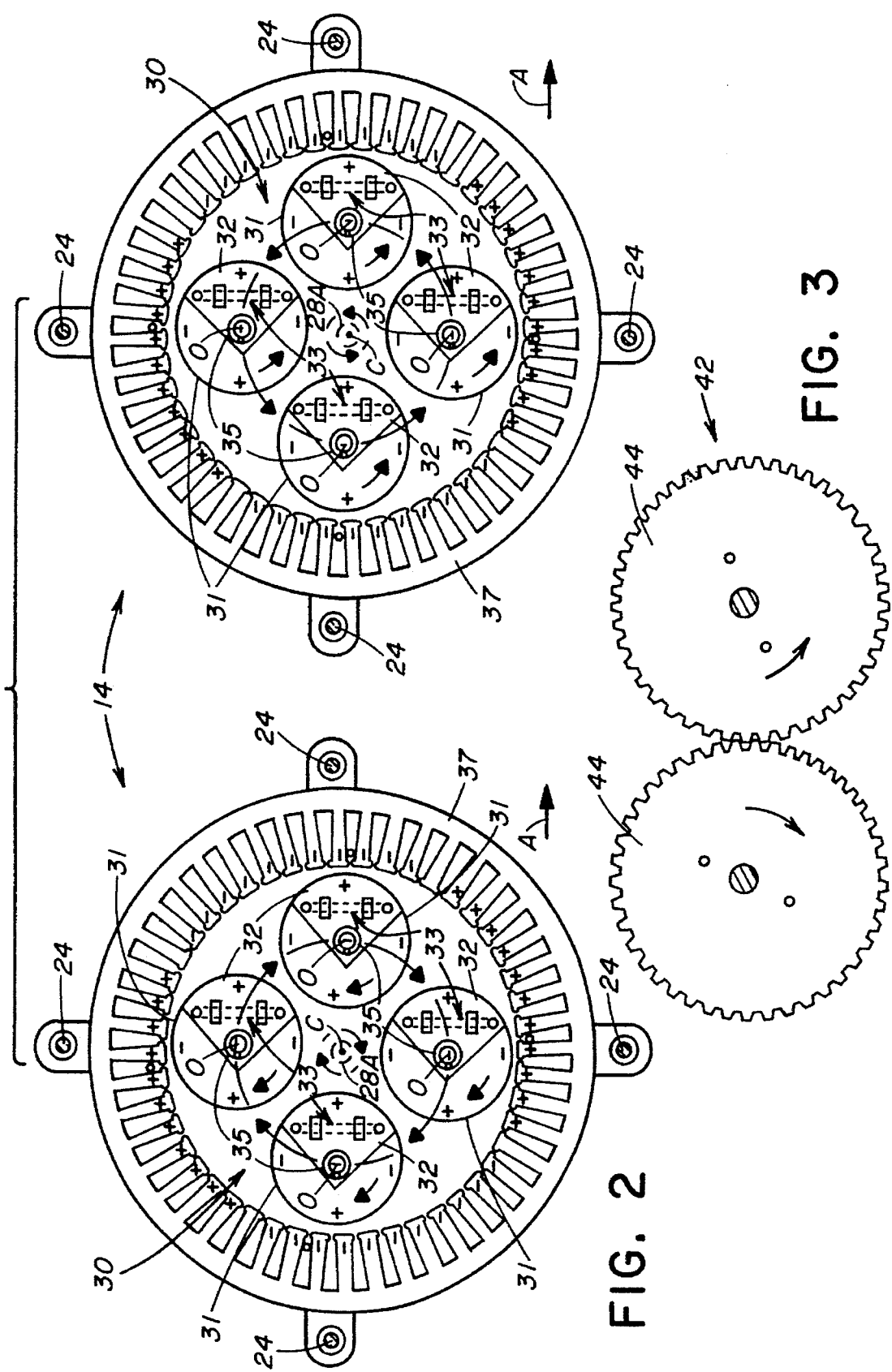
FIG. 2 is a plan view of a pair of axially-parallel arranged, counterrotatably-driven, and asymmetrically-accelerated eccentric mass subsystems employed in the system.
FIG. 3 is a plan view of a pair of a synchronizing means in the form of a pair of timing gears employed in the system.

Each parallel eccentric mass subsystem 14, which is illustrated in FIGS. 1 and 2 and will be briefly described hereinafter, is substantially the same in construction and operation as the electromagnetic implementation of the translational force generating apparatus illustrated and described in U.S. Pat. No. 5,150,626, the disclosure of which is incorporated herein by reference. As an alternative, each parallel eccentric mass subsystem 14 employed herein could be the same as the mechanical implementations disclosed in the aforecited U.S. patent. In view that a complete detailed understanding of the construction and operation of the subsystem 14 can be readily gained by reference to the aforecited patent, each subsystem 14 need only be described and illustrated herein to the extent necessary to understand the function thereof in the system 10 of the present invention.

Referring to FIGS. 1 and 2, each of the parallel eccentric mass subsystems 14 of the controlled translational force generating system 10 which generate the respective initial translational forces includes an auxiliary frame 26, a rotary drive mechanism 28, an orbital frame 30, a plurality of orbital members 32, and a coupling mechanism 34. The rotary drive mechanism 28 preferably in the form of an electric motor 28 is mounted to the auxiliary frame 26 and has a rotary output drive shaft 28A extending downwardly therefrom through the auxiliary frame 26. The orbital frame 30 is mounted to the legs 24 of the main frame 12 and attached to the rotary output drive shaft 28A of the rotary drive mechanism 28 for undergoing revolution about a central axis C upon operation of the rotary drive mechanism 28. The orbital frame 30 is composed of upper and lower horizontal decks 30A, 30B and a plurality of support shafts 35 extending between and journalled at their opposite ends by bearings 39 to the upper and lower decks 30A, 30B. The orbital members 32 are mounted to the orbital frame 30 for undergoing revolution with the orbital frame 30 about the central axis C. The orbital members 32 are also mounted to the orbital frame 30 for undergoing rotation about orbital axes O defined on the orbital frame 30. Each of the orbital members 32 supports spring-mounted weights 33 defining the offset center of mass of the respective member 32. Thus, the orbital members 32 have their centers of mass predisposed in eccentric relation to and preset angular positions relative to the respective orbital axes O. The electrical coupling mechanism 34 which includes electrical brushes 34A and electrical conductors 34B, is electrically coupled to the orbital members 32 for providing appropriate levels of electrical power producing rotation of the orbital members 32 in a first direction about their orbital axes O at the same frequency as the orbital members 32 undergo revolution with the orbital frame 30 in a second opposite direction about the central axis C. In such manner, the centers of mass of the orbital members 32 are maintained at the respective preset angular positions relative to the orbital axis O and thereby the orbital members 32 are asymmetrically accelerated relative to the central axis C so as to impart a respective one of the initial translational forces to the main frame 12 of the system 10.

In the electro-magnetic implementation of the eccentric mass subsystems 14, the orbital member 32 are part of orbital armatures 31 mounted to support shafts 35 and the rotation-producing coupling means is an annular stator 37 stationarily mounted to the legs 24 of the main frame 12 and surrounding the orbital armatures 31. The armatures 31 are preferably four in number and define a quadrupole arrangement with the stator 37. Direct current variable voltage power can be supplied to the stator 37 and orbital armatures 31; however, alternating current can be configured to the stator 37 as well as the armatures 31. Also, by implementation of superconductors, superconductivity can be used to create superconducting magnetic fields in the electromagnetic implementation of the subsystems 14.

With respect to the pair of parallel eccentric mass subsystems 14 of the controlled translational force generating system 10, the respective directions of rotation and revolution of the orbital frame 30 and orbital members 32 of the one subsystem 14 are counter to the respective directions of rotation and revolution of the orbital frame 30 and orbital members 32 of the other subsystem 14. For instance, the orbital frame 30 of the right eccentric mass subsystem 14 in FIG. 1 rotates counterclockwise about its respective central axis C, whereas the orbital frame 30 of the left eccentric mass subsystem 14 in FIG. 1 rotates clockwise about its respective central axis C. Additionally, the orbital members 32 of the right orbital frame 30 rotate clockwise about their respective orbital axes O, whereas the orbital members 32 of the left orbital frame 30 rotate counterclockwise about their respective orbital axes O. The counterrotational relationship of the respective components of the one subsystem 14 relative to the corresponding components of the other subsystem 14 and the parallel relationship of the central rotational axes C of the subsystems 14 are the features of the system 10 responsible for causing the generally straight-line orientation of the combined translational force which results from the initial translational force generated by the combined operation of the subsystems 14, in contrast to the generally curved orientation of the initial translational force generated by the single eccentric mass subsystem disclosed in the aforecited U.S. patent and by each one of the subsystems 14 alone.

Referring again to FIG. 1, each of the parallel balance subsystems 16 of the controlled translational force generating system 10 which coooperate with one another to internally produce the controlled reference environment includes a rotary power source 36 in the form of an electric drive motor 36 mounted upon the upper platform 18 of the main frame 12 and a rotary balance wheel 38 disposed below the upper platform 18. The rotary balance wheel 38 is attached to the lower end of and rotates with a rotary output drive shaft 36A of the electric drive motor 36 which extends downwardly through the upper platform 18. The electric drive motors 36 are respectively axially aligned with the central axes C of the subsystems 14 and counterrotate in the same sense with respect to one another as the subsystems 14 counterrotate with respect to one another. The balance wheels 38 which counterrotate relative to one another with counterrotation of the drive motors 36 produce the controlled reference environment of the system 10 with respect to which the parallel eccentric mass subsystems 14 interact to produce the translational movement of the system 10.

Thus, the controlled reference environment of the system 10 is represented by the opposing forces produced by the oppositely rotating masses of the counterrotating balance wheels 38. In view that in the case where the masses of the balance wheels 38 are substantially equal, the balance wheels 38 are rotated at substantially the same rates, then these opposing forces will be substantially equal and thus will counterbalance one another.

By separately and variably adjusting the individual rotational rates of the rotary output drive shafts 28A, 36A of the electric drive motors 28, 36 of the parallel eccentric mass and balance subsystems 14, 16, the resultant translational force generated by the parallel eccentric mass subsystems 14 through interaction with the reference environment can be controllably steered in any predetermined direction to move the overall system 10 along any desired directional path. The electric drive motors 28, 36 can be powered from any suitable source. For example, they could be powered by the electricity produced by a panel of photovoltaic cells. Suitable conventional controls 40, such as variable auto transformer, voltage regulator and the like, are provided to control the rotational rates of the motors 28, 36.

Referring to FIG. 3, the controlled translational force generating system 10 also includes synchronizing means 42 in the form of a pair of large timing gears 44 which are mounted in the same horizontal plane, have the same diameters and peripherally intermesh with one another, are connected to lower ends of the respective orbital frames 30. The timing gears 44 are rotated therewith in opposite directions with respect to one another in the same sense as the subsystems 14 are counterrotated relative to one another so as to maintain the subsystems 14 in a synchronized relation with one another. Although the timing gears 44 shown in FIG. 3 are components which provide mechanical synchronization of the subsystems 14, it should be understood that, as an alternative, they could be components which provide electromagnetic synchronization thereof.

INDUSTRIAL APPLICABILITY

Some important areas of industrial application of the controlled translational force generating system 10 are in producing of movement of robotic equipment. It should be readily understood that the overall size of the system 10 can be scaled either up or down to fit the particular application.

It should be understood from the foregoing description that various changes may be made to the present invention without departing from the spirit and scope of the invention or sacrificing all of its material advantages, the form hereinbefore described being merely preferred or exemplary embodiment thereof.

I claim:

1. A controlled translational force generating system, comprising:

(a) a main frame;

(b) a first set of subsystems mounted on said main frame and being counterrotatable relative to one another to generate a set of initial translational forces, said first set of subsystems including a pair of axially-parallel arranged, counterrotatably-driven, and asymmetrically-accelerated eccentric mass subsystems being operable to generate said set of initial translational forces, said eccentric mass subsystems being disposed along and counterrotatably driven about generally parallel spaced apart axes, each of said eccentric mass subsystems including (i) a rotary drive mechanism, (ii) an orbital frame connected to and rotatably driven by said rotary drive mechanism, and (iii) a plurality of orbital members mounted to said orbital frame for undergoing revolution with the orbital frame about one of said parallel axes, said orbital members also being eccentrically mounted to said orbital frame for undergoing rotation about orbital axes defined on said orbital frame in directions opposite to that of orbital frame; and (c) a second set of subsystems mounted on said main frame and being counterrotatable relative to one another to produce a controlled reference environment such that interaction of said first set of subsystems with said controlled reference environment generated by said second set of subsystems produces from said set of initial translational forces a controllably steerable straight-line resultant translational force that causes said system to move along a desired directional path, said second set of subsystems including a pair of axially-parallel arranged and counterrotatable and controllable balance subsystems being operable to internally produce said reference environment such that by separately and variably adjusting rotational rates of said parallel eccentric mass and balance subsystems said resultant translational force generated by said parallel eccentric mass subsystems through interaction with said reference environment is controllably steerable in any predetermined direction to move said system along any desired directional path, each of said parallel balance subsystems including:

(i) a rotary power source mounted to said main frame; and (ii) a rotary balance wheel attached and rotatable with said rotary power source such that counterrotation of said rotary balance wheels of said parallel balance subsystems produces said controlled reference environment of said system with respect to which said parallel eccentric mass subsystems interact to produce said translational movement of said system, said rotary power source and said rotary balance wheel of each of said parallel balance subsystems being axially aligned with one another, said rotary power source and rotary balance wheel of each of said parallel balance subsystems being axially aligned with and spaced from one of said eccentric mass subsystems.

2. The system of claim 1 wherein said rotary drive mechanism is an electric drive motor having a rotary output drive shaft, said orbital frame being attached to said rotary output drive shaft thereof for undergoing revolution about one of said parallel axes upon operation of said electric drive motor.

3. The system of claim 1 wherein said orbital members have centers of mass predisposed in eccentric relation to and preset angular positions relative to said respective orbital axes such that said orbital members are asymmetrically accelerated relative to said respective rotational axis of said orbital frame so as to impart a respective one of said initial translational force to said main frame.

4. The system of claim 1 wherein said rotary power source is an electric drive motor having a rotary output drive shaft, said rotary balance wheel being attached to said rotary output drive shaft thereof for undergoing rotation therewith upon operation of said electric drive motor.

5. The system of claim 1 further comprising:

synchronizing means connected to said first set of subsystems and being operable for maintaining said first set of subsystems in synchronized relation with one another.

6. The system of claim 5 wherein said synchronizing means includes a pair of timing gears being which are mounted in a common plane and coupled to one another and connected to said subsystems of said first set thereof so as to counterrotate relative to one another in the same sense as said subsystems of said first set counterrotate relative to one another.

7. A controlled translational force generating system, comprising:

(a) a main frame;

(b) a first set of subsystems mounted on said main frame and being counterrotatable relative to one another to generate a set of initial translational forces, said first set of subsystems including a pair of axially-parallel arranged, counterrotatably-driven, and asymmetrically-accelerated eccentric mass subsystems being operable to generate said set of initial translational forces, said eccentric mass subsystems being disposed along and counterrotatably driven about generally parallel spaced apart axes, each of said eccentric mass subsystems including (i) a rotary drive mechanism, (ii) an orbital frame connected to and rotatably driven by said rotary drive mechanism, and (iii) a plurality of orbital members mounted to said orbital frame for undergoing revolution with the orbital frame about one of said parallel axes, said orbital members also being eccentrically mounted to said orbital frame for undergoing rotation about orbital axes defined on said orbital frame in directions opposite to that of said orbital frame;

(c) a second set of subsystems mounted on said main frame and being counterrotatable relative to one another to produce a controlled reference environment such that interaction of said first set of subsystems with said controlled reference environment generated by said second set of subsystems produces from said set of initial translational forces a controllably steerable straight-line resultant translational force that causes said system to move along a desired directional path, said second set of subsystems including a pair of axially-parallel arranged and counterrotatable and controllable balance subsystems being operable to internally produce said reference environment, each of said parallel balance subsystems including:

(i) a rotary power source mounted to said main frame; and (ii) a rotary balance wheel attached and rotatable with said rotary power source such that counterrotation of said rotary balance wheels of said parallel balance subsystems produces said controlled reference environment of said system with respect to which said parallel eccentric mass subsystems interact to produce said translational movement of said system, said rotary power source and said rotary balance wheel of each of said parallel balance subsystems being axially aligned with one another, said rotary power source and rotary balance wheel of each of said parallel balance subsystems being axially aligned with and spaced from one of said eccentric mass subsystems; and (d) means for separately and variably adjusting the rotational rates of said parallel eccentric mass and balance subsystems such that said resultant translational force generated by said parallel eccentric mass subsystems through interaction with said reference environment is controllably steerable in any predetermined direction to move said system along any desired directional path.

8. The system of claim 7 wherein said orbital members have centers of mass predisposed in eccentric relation to and preset angular positions relative to said respective orbital axes such that said orbital members are asymmetrically accelerated relative to said respective rotational axis of said orbital frame so as to impart a respective one of said initial translational force to said main frame.

* * * * *